INVENTOR
CHRISTIAN H. STETTLER by: Wolfe, Hubbard, Voit & Osann
ATTYS.

Feb. 23, 1971  C. H. STETTLER  3,564,898
SHRINK-FORMING APPARATUS WITH INTEGRAL TOOLING
Filed June 14, 1968  2 Sheets-Sheet 2
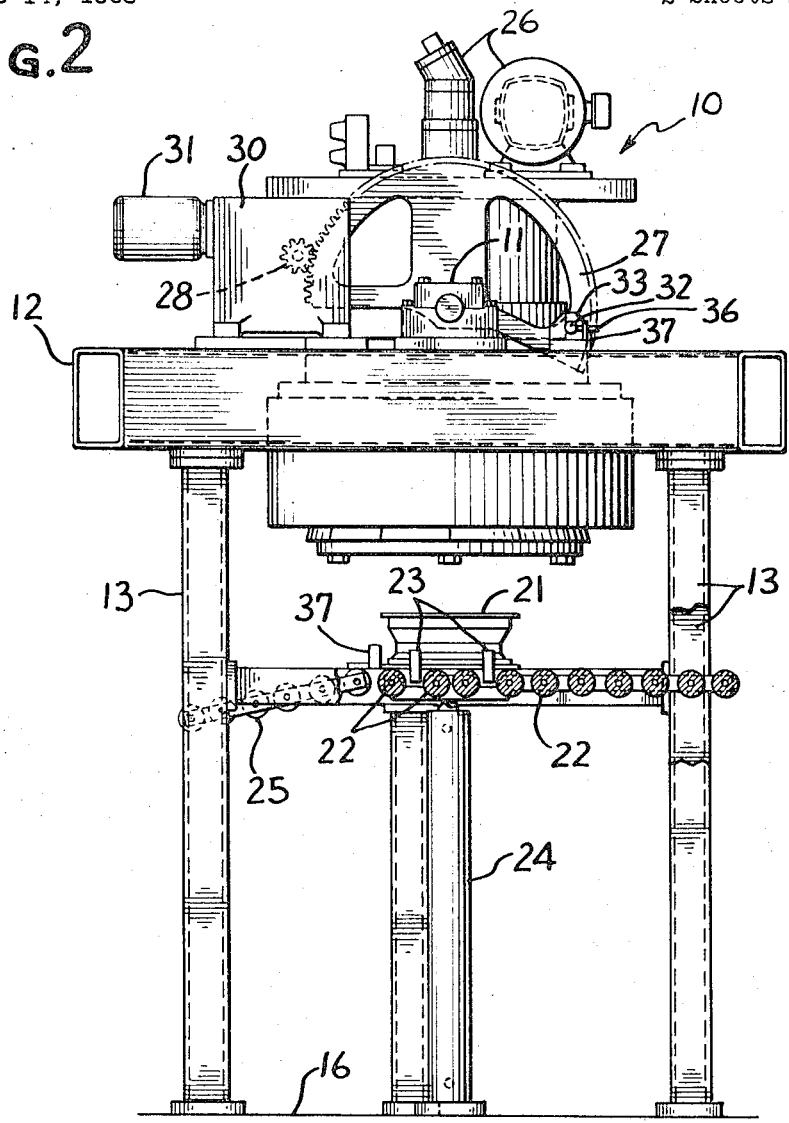
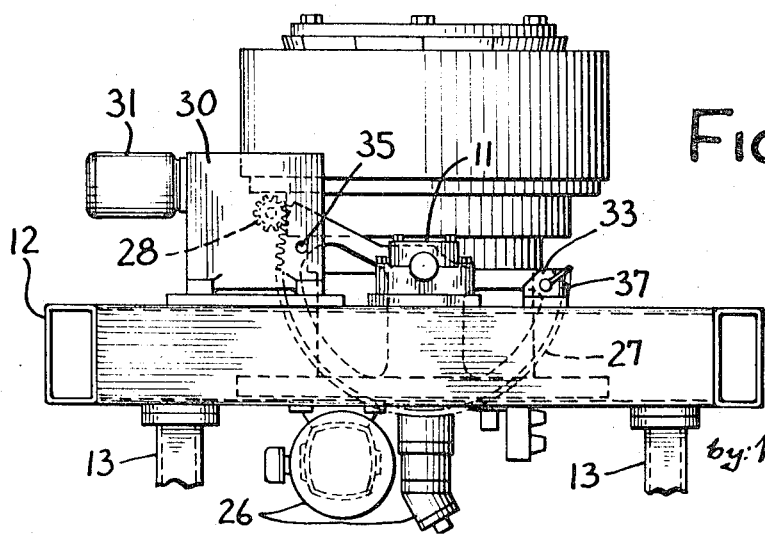
INVENTOR
CHRISTIAN H. STETTLER
by Wolfe, Hubbard, Voit & Osann
ATTYS.

3,564,898
SHRINK-FORMING APPARATUS WITH
INTEGRAL TOOLING
Christian H. Stettler, Northbrook, Ill., assignor to Grotnes Machine Works, Inc., Chicago, Ill., a corporation of Illinois
Filed June 14, 1968, Ser. No. 737,014
Int. Cl. B21j 9/06
U.S. Cl. 72—402            3 Claims

ABSTRACT OF THE DISCLOSURE

Apparatus for radial compression forming of metal articles is described in which a plurality of radially contractable die jaw segments in a shrink-forming head are disposed in a horizontal plane vertically above a workpiece feeding station with auxiliary tooling also being contained optionally within the head. The shrink-forming head and tooling are carried on trunnions for rotation about a horizontal axis to allow access and maintenance to the dies and tooling.

---

The present invention relates generally to apparatus for shrinking or radial compression forming of metal articles. In its principal aspect the invention is concerned with the disposition of the shrink-forming head and auxiliary tooling, if any, relative to a workpiece loading station situated immediately adjacent the forming dies. The present invention is praticularly adapted for use with a compression forming head of the type shown and disclosed in detail in the co-pending application of Hans R. Luedi and Christian H. Stettler, Ser. No. 694,237, filed Dec. 28, 1967 for Methods and Apparatus for Shrink-Forming Metal Articles, now Pat. 3,461,710. The exemplary embodiment of the present invention incorporates such a shrink-forming head, although the invention is not to be so limited in scope.

In compression forming of certain metal articles, problems have been encountered in regard to chipping or flaking of surface scale from the article during the compression process. Such scale is often formed on metal pieces during previous fabricating operations. For example, steel automobile wheels are commonly fabricated by welding together several pressed component pieces, and bits of very hard and abrasive welding slag or mill scale may remain after fabrication and become loosened during the compression forming step. In addition, simultaneous machining operations may be carried out by auxiliary tooling within the shrink-forming head itself, as particularly disclosed in the aforementioned application Ser. No. 694,237. Again by way of example, such auxiliary tooling may comprise powered reamers which finish machine the mounting holes in the automobile wheels to final size in a precise location relative to the wheel rim. Such operations generate metal chips and similar debris from the cutting process.

In previous machines with upright or angled heads opening upward, such mill scale, chips, and other debris was left to collect within the shrink-forming head itself. The presence of this material caused undesired effects, such as excessive wear on moving parts and marred surfaces on the finished metal articles. A further difficulty with previous shrink-forming apparatus has been that automated loading and unloading processes and associated equipment has made it extremely difficult to service the shrink-forming equipment and auxiliary tooling. The transfer and loading mechanisms required for automated loading and unloading processes substantially interfered with access to the interior of the shrink-forming head, making repair and maintenance of the forming dies and auxiliary tooling difficult or impossible without first removing the automated transfer equipment.

Accordingly, it is a principal object of the present invention to provide an improved apparatus for radial compression forming of metal articles in which mill scale, metal chips, and other debris will not be retained within the forming jaws and tooling during operation, but will be substantially ejected during each loading and removal step.

Another object is to provide an apparatus of the above description for use with automated loading and unloading equipment which is quickly and easily accessible for service and maintenance of the compression forming mechanism and any auxiliary tooling which may be employed in conjunction therewith.

Other objects and advantages of the invention will become apparent from reading the following detailed description and from reference to the drawings, in which:

FIG. 2 is an end elevation taken 90° from that of FIG. 1; and

FIG. 3 is an end elevation corresponding to part of FIG. 2 but illustrating the inverted position of the shrink-forming head.

Figure 1:
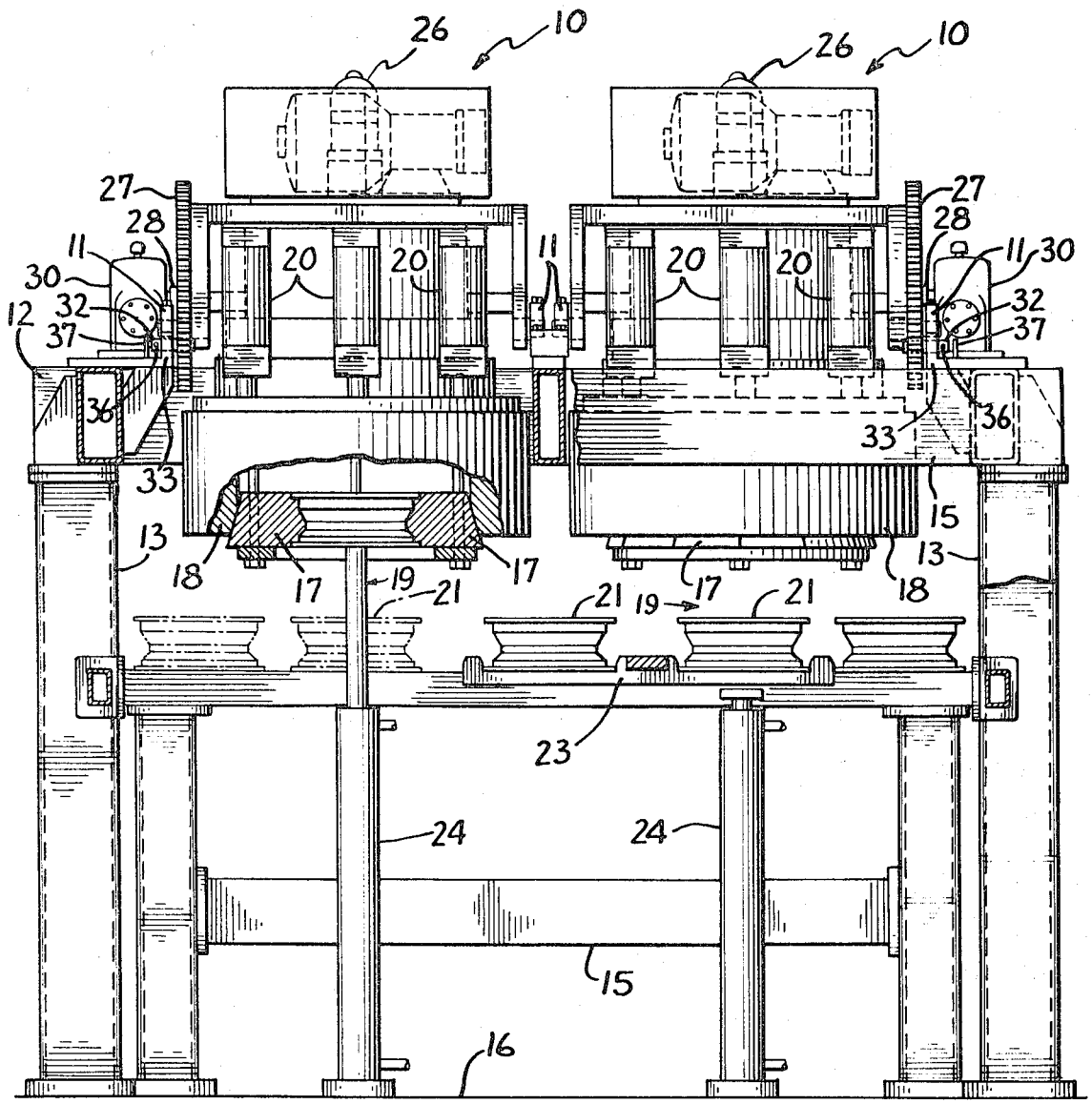
FIG. 1 is a side elevation of a shrink-forming apparatus constructed according to the present invention and having two separate shrink-forming heads.

While the invention will be described in connection with a particular exemplary embodiment, it will be understood that it is not intended to so limit the invention, but it is instead intended to cover all alternative and equivalent constructions as may be included within the spirit and scope of the invention as defined by the appended claims.

With reference to the drawings, there is shown in FIG. 1 an exemplary compression forming machine embodying the present invention. The machine employs two compression forming heads 10 mounted for rotation on trunnions 11 which are supported by a frame 12. The frame 12 consists of uprights 13 and cross members 15, and is rigidly supported on a base or floor 16.

Each individual head 10 is supported by trunnions 11 for rotation about a horizontal axis. The axis preferably extends through the cylindrical body of each head 10 at approximately its center of gravity so that rotation may be easily accomplished.

The individual shrink-forming heads 10 will be described briefly, but for greater detail the reader is referred to the Luedi et al. Pat. 3,461,710 mentioned previously. Each head 10 comprises a cylindrical body open at each end. Within the body of each head 10 are a plurality of circumferentially spaced die jaw segments 17 arranged in a horizontal plane. The segments 17 are radially contractable by movement of a pressure ring 18 which meets each of the die segments 17 in camming engagement to force them radially inward. At their inner limits of movement, the segments 17 define a substantially continuous circumferential forming die. Power means consisting of hydraulic cylinders 20 are disposed circumferentially about the body of each head 10 and serve to forcibly move the pressure ring 18 in an axial direction for contraction of the die.

Beneath the heads 10 is a workpiece feeding station, generally indicated at 19, and a loading mechanism.

In the exemplary embodiment, the workpieces constitute automobile wheels 21 which are fed by a powered roller conveyor 22 to a central station of a two-piece transfer shuttle 23. The shuttle 23 is shiftable between two alternate positions in which one of the shuttle end positions constitutes the workpiece feeding station 19 located directly beneath one of the heads 10. Beneath each of the heads 10 is a lift table 24 utilizing hydraulic power means for raising an individual wheel 21 from its feeding station 19 in the transfer shuttle into the open jaws of the shrink-forming head 10. When the forming operation has been accomplished, the lift table 24 lowers the finished wheel 21 back to its original position beneath the head.

Upon being ejected from the workpiece feeding station 19 by the sideways movement of the shuttle 23, the finished wheel 21 is pushed onto a roller ramp 25 adjacent each head 10, on which the finished wheel is carried by gravity away from the machine and to further manufacturing operations. Control mechanism (not shown) of known design is used to coordinate the operation of the transfer shuttle 23, lift table 24, and forming dies 17.

Taking the operation of the feeding means and transfer means by individual steps, a wheel 21 is received from the roller conveyor 22 on, for instance, the left station of the transfer shuttle 23. The shuttle 23 is in its right-hand position, as seen in FIG. 1. Thereupon the shuttle 23 shifts to the left, bringing the new wheel directly beneath the left shrink-forming head 10. Then the lift table 24 beneath the left head raises the wheel 21 into the downward-facing open lower end of the head, whereupon it is gripped by the shrinking jaws and formed to the desired shape. During forming, the shuttle 23 again shifts to the right as seen in FIG. 1, having picked up a new wheel 21 and moving it beneath the right shrink-forming head 10. When the forming operation in the left head is complete, the lift table 24 lowers the finished wheel back to its original position in the workpiece feeding station beneath the head. The transfer shuttle 23 then receives a new wheel 21 in its left station as before, and upon again shifting to the left, simply pushes the previously finished wheel away from the workpiece feeding station onto the ramp 25 and presents the new wheel 21 ready for loading. The same operation is followed in alternate sequence with the right shrink head 10.

Optionally, auxiliary tooling 26 may be carried within each shrink-forming head 10 to perform a machining operation on the wheel workpiece 21 while it is retained within the die jaws 17. In the exemplary embodiment, such tooling comprises reamers for finish machining the mounting holes within the wheel hubs to their final size and position. This is desirably accomplished while the wheel is still retained in the forming die in order to assure maximum concentricity.

As a principal feature of the invention, each shrink-forming head 10 is disposed vertically with the ring of die segments 17 carried in a normal operating position in a plane facing and vertically above the workpiece feeding station and the lift table 24. The auxiliary tooling 26 within the forming head is carried above the ring of die segments 17 for axial movement to engage the workpiece. For operation, it can be seen that the auxiliary tooling 26 is carried in a normally upper end of the shrink-forming head 10, and engages each workpiece in a normally downward direction.

Further pursuant to the invention, each head is individually rotatable about its trunnions 11 to present the die mechanism and auxiliary tooling either to the side or in an upward direction for access and maintenance. It has been found to be difficult or impossible to gain access to the inner portions of the shrink-forming head 10 with the feeding and transfer means in place as shown in the figures. To perform even routine maintenance, such as changing reamer dies, has required virtually the entire removal of the shuttle mechanism 23, the lift tables 24 and other portions of the transfer and feeding means. Since this mechanism is desirably highly automated and complex, much time and effort is expended in removing and replacing it. With the rotatable head provided by the invention, however, all of the forming and tooling mechanism can be swung around and presented in a sideways or, preferably, upward direction for ease of service.

Rotation is achieved by providing a semi-circular gear segment 27 on one side of each forming head 10. The gear segment 27 meshes with a pinion 28 driven through a speed reduction box 30 by an electric motor 31. For locking the rotatable head 10 in place during forming operations, a locking pin means is provided consisting of a slidable lock pin 32 carried by the frame 12 in a housing 33 and engageable with a corresponding hole 35 in the semi-circular gear segment 27. The pin 32 is provided with a handle 36 which is raised to clear a blocking pin 37 and is shiftable between the engaged and disengaged positions. By removing the lock pin 32 from the hole 35, the head is free to be rotated through energization of the motor 31. The entire head may then be rotated to present the normally downward-facing underside of the head either to the side of the machine or vertically upward. When servicing has been carried out, the head 10 is returned to its normal position and the lock pin 32 re-inserted. Preferably, the head is rotated substantially 180° to present the dies and auxiliary tooling in a vertical direction, although some maintenance may also be carried out when the head has been turned sideways through only 90° of rotation.

The following is claimed as invention:

1. Apparatus for radial compression forming of metal articles comprising, in combination, a frame, a workpiece feeding station within the frame, a shrink-forming head having a plurality of radially contractable compression forming die jaws disposed in operating position in a plane facing and vertically above said workpiece feeding station, said shrink-forming head having centrally disposed internal auxiliary tooling means for engaging a workpiece within the compression forming die jaws, said tooling being disposed above said workpiece to effect engagement in a downward direction, and said shrink-forming head being rotatably carried by said frame on a horizontal rotational axis and having means for rotating said shrink-forming head at least 90° from the operating position whereby the underside of the head is presented for access and maintenance, power means for contracting said die jaws about a workpiece for compression forming thereof, and lifting means for raising a workpiece from the workpiece feeding station into the shrink-forming die jaws and removing it therefrom.

2. Apparatus for radial compression forming of metal articles comprising, in combination:

a frame having a workpiece feeding station within the lower portion thereof;

a shrink-forming head rotatably carried by the frame on trunnions about a horizontal rotational axis overlying the workpiece feeding station;

said shrink-forming head comprising a substantially cylindrical body open at each end and having a plurality of circumferentially spaced die jaw segments and a concentric pressure ring in camming engagement with said segments for effecting radial inward compressive movement, said die segments defining at their inner limits a substantially continuous circumferential forming die;

said shrink-forming head further including auxiliary tooling means carried at a normally upper end of the head opposite the workpiece feeding station and operatively engageable in a normally downward direction with a workpiece gripped by the die segments at their inner limits of radial contraction;

power means for forcibly contracting the die segments;

feeding means including a lift table for vertically raising a workpiece from the workpiece feeding station into the open die jaws of the shrink-forming head, and removing said workpiece therefrom at the conclusion of the forming operation; and transfer means for alternating feeding workpieces to the lift table for insertion into the die jaws and removing finished compression formed workpieces from the lift table for transfer to subsequent operations.

3. Apparatus as defined in claim 2 including on the frame a pinion gear and power means for rotating said pinion gear, and having a semi-circular gear segment carried by the shrink-forming head in mesh with the pinion gear, whereby the shrink-forming head and auxiliary tooling contained therein may be rotated substantially 180° for access and maintenance.

References Cited

UNITED STATES PATENTS

| | | | |
|---|---|---|---|
| 2,295,852 | 9/1942 | Jeune | 29—159.1 |
| 2,802,381 | 8/1957 | Leasia | 72—419 |
| 3,422,750 | 1/1969 | Anderson | 100—231 |
| 3,461,710 | 8/1969 | Luedi | 72—372 |

FOREIGN PATENTS 990,016    4/1965    Great Britain.

CHARLES W. LANHAM, Primary Examiner

G. P. CROSBY, Assistant Examiner

U.S. Cl. X.R.

29—159.1; 72—452, 419; 100—193